United States Patent Office 2,805,971
Patented Sept. 10, 1957

2,805,971

WELDING FLUX

Henry B. Bryan, Troy, Ohio, assignor to The Hobart Brothers Company, Troy, Ohio, a corporation of Ohio No Drawing. Application December 30, 1954,
Serial No. 478,941

3 Claims. (Cl. 148—26)

This invention relates to a flux for use in electric welding processes, especially of the blanketed welding type wherein the flux is applied onto the workpiece and the welding effected by the use of an electrode submerged in the flux.

The invention provides an improved flux which is adapted to be placed on the work and melted during the welding operation, forming a protective blanket over the molten metal weld portion.

It has been proposed heretofore to compound welding fluxes by admixing various ingredients and fusing the entire mixture to produce a vitrified mass which is cooled and ground to provide a powdered flux product. This method of compounding a flux is expensive and also has the disadvantage that dust-like particles are produced which must be reworked or discarded as waste.

In accordance with the present invention a granular flux mixture is provided which is substantially free of fines and wherein each particle of the flux consists of substantially the same constituents and in like proportionate amounts. A flux is thus provided having the proper blend of constituents to produce the required fluxing action and which in use will melt and exert a cleaning action on the metal surfaces being welded, as well as forming a protective deoxidizing slag layer over the molten metal.

It is an object of the invention to provide an improved flux of the character described, and in which the constituents are admixed together and bonded by the addition of a siliceous material e. g. an alkali metal silicate, and heating the mixture to produce a coherent solid mass without thoroughly melting the same.

It is another object of the invention to provide a flux for submerged arc welding which forms a protective layer or blanket over the weld surfaces and lower end portion of the welding therein.

Another object of the invention is to provide a welding flux consisting of a blend of comminuted constituents in the proper proportions which are bonded together by a siliceous material, e. g., alkali metal silicate such as sodium silicate, scrap glass or the like, which is sintered together.

These and other objects and advantages will become apparent from the following description.

In accordance with the present invention a flux of the character described is provided by employing a mixture of rutile, silica sand, fluorspar, ferrosilicon, ferromanganese and marble, together with a bonding agent such as ground scrap glass or sodium silicate solution, the mass being heated sufficiently to set or sinter the binder to form an agglomerate which is then ground to provide a granular flux.

The principal constituents are rutile and silica sand, the rutile constituent preferably being present in the range of 25–35% based on the dry weight of and the flux composition, and silica sand being used in substantially equal amount by weight as rutile.

Fluorspar, ferrosilicon and ferromanganese comprise minor constituents, fluorspar and ferromanganese preferably comprising substantially equal proportionate amounts and each constituting on the order of about 5% by weight of the flux. The amount of ferrosilicon used approximates one-third that of the fluorspar. Marble comprises 15 to 20% by weight and the scrap glass or silicate bonding agent constitutes about 10 to 20% by weight of the flux, sufficient amount being used to cause the constituents to cohere and form an agglomerate when admixed therewith and heated.

Specific formulations of the flux are illustrated by the following examples and which have been found to be highly satisfactory in use.

*Example I*

| | Parts by weight |
|---|---|
| Rutile (TiO$_2$) | 28.39 |
| Silica sand (SiO$_2$) | 28.39 |
| Fluorspar (CaF$_2$) | 4.37 |
| Ferrosilicon (50% grade) | 1.46 |
| Ferromanganese | 4.37 |
| Marble (calcium carbonate) | 16.47 |
| Glass cullet (100 mesh) | 16.55 |
| | 100.00 |

The foregoing constituents, including scrap glass cullet ground to 100 mesh, are intermixed in dry finely ground state and heated to a temperature sufficient to cause softening of the glass cullet and formation of an agglomerate in which the various ingredients are uniformly distributed. The glass cullet may comprise different type glass, e. g., lime, borosilicate lead and the like. Sodium calcium glasses are readily softened by heat. Heating of the mixture to a temperature of between about 1500 and 1900° F. is generally sufficient to bring about softening or sintering of the powdered glass to cause the materials to be bonded together forming an agglomerate. The resultant mass is then broken up into granules of approximately 10 to 100 mesh.

*Example II*

| | Parts by weight |
|---|---|
| Rutile (TiO$_2$) | 29.86 |
| Silica sand (SiO$_2$) | 29.86 |
| Fluorspar (CaF$_2$) | 4.59 |
| Ferrosilicon (50% grade) | 1.53 |
| Ferromanganese | 4.59 |
| Marble (calcium carbonate) | 17.32 |
| Sodium silicate solution | 12.25 |
| | 100.00 |

The foregoing constituents are mixed to a relatively dry finely powdered state and heated to approximately 1800° F. to cause the sodium silicate to soften or fuse and agglomerate the ingredients together. The resulting agglomerated mass is then crushed to approximately 10–100 mesh as in Example I to provide a flux wherein the constituents are uniformly distributed throughout the product. The sodium silicate solution preferably comprises a silicate wherein the ratio of Na$_2$O to SiO$_2$ is 3.22:1. Other silicate solutions may be used which are suitable for bonding the various ingredients of the flux. If desired an anhydrous solid alkali metal silicate or a combination of the same with silicate solutions may be employed.

In the improved flux composition the use of a major proportion of rutile and sand, together with half as much in proportionate amount of marble and glass or sodium silicate provides a flux which has improved cleaning and slagging properties over the fluxes wherein silicates alone constitute the principal ingredient. The use of fluorspar and ferrosilicon and ferromanganese provides a flux composition especially useful for submerged arc welding.

The invention provides a free-flowing granular flux material which does not require that the ingredients be pre-melted together and ground, but merely sinter-bonded to form an agglomerate. Thus, a granular flux is produced having a relatively low density and accordingly higher covering power per unit of weight. A flux having excellent protective properties is produced at substantially lower cost than prior known fusion methods.

The flux composition of the invention, while particularly useful in so-called submerged arc welding processes may be employed as a flux in other conventional welding operations. It will also be understood that the ingredients may be varied somewhat in proportionate amounts and substitutions made of equivalent materials without departing from the spirit and scope of this invention, and as more particularly pointed out in the appended claims.

What is claimed is:

1. A flux for use in arc welding which is composed of a granular free flowing mixture consisting of the following constituents in the approximate parts by weight: rutile 28.39; silica sand 28.39; fluorspar 4.37; ferrosilicon 1.46; ferromanganese 4.37; marble 16.47; glass cullet finely divided 16.55.

2. A flux for use in arc welding which is composed of a granular free flowing mixture consisting of the following constituents in the approximate parts by weight: rutile 29.86; silica sand 29.86; fluorspar 4.59; ferrosilicon 1.53; ferromanganese 4.59; marble 17.32; and sodium silicate solution 12.25.

3. A flux for use in arc welding which is composed as follows:

| | Parts by weight |
|---|---|
| Rutile | 28.39 to 29.86 |
| Silica sand | 28.39 to 29.86 |
| Fluorspar | 4.37 to 4.59 |
| Ferrosilicon | 1.46 to 1.53 |
| Ferromanganese | 4.37 to 4.59 |
| Marble | 16.47 to 17.32 | and alkali metal silicate binder selected from the group consisting of glass cullet and sodium silicate constituting the remainder to make 100%.

References Cited in the file of this patent

UNITED STATES PATENTS

| 2,360,716 | Peters | Oct. 17, 1944 |
| 2,460,988 | Koopman | Feb. 8, 1949 |
| 2,474,787 | Landis | June 28, 1949 |